United States Patent
Joshi et al.

(10) Patent No.: US 12,118,372 B2
(45) Date of Patent: Oct. 15, 2024

(54) APP USAGE MODELS WITH PRIVACY PROTECTION

(71) Applicant: Microsoft Technology Licensing, LLC, Redmond, WA (US)

(72) Inventors: Dhruv Joshi, Kirkland, WA (US); David William Brown, Kirkland, WA (US); Dolly Sobhani, Seattle, WA (US); Brian Eugene Kihneman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/948,942

(22) Filed: Sep. 20, 2022

(65) Prior Publication Data

US 2024/0095051 A1  Mar. 21, 2024

(51) Int. Cl.
*G06F 9/451* (2018.01)
*G06F 21/62* (2013.01)

(52) U.S. Cl.
CPC .......... *G06F 9/453* (2018.02); *G06F 21/6245* (2013.01)

(58) Field of Classification Search
CPC ............................. G06F 9/453; G06F 21/6245
See application file for complete search history.

(56) References Cited

U.S. PATENT DOCUMENTS

| | | | |
|---|---|---|---|
| 10,394,917 B2 * | 8/2019 | Greenwood | G06N 20/10 |
| 10,783,054 B2 * | 9/2020 | Wang | H04L 9/50 |
| 10,901,758 B2 * | 1/2021 | Arar | H04L 67/535 |
| 11,218,558 B2 * | 1/2022 | Wilson | H04L 51/18 |
| 11,508,360 B2 * | 11/2022 | Peng | G06F 40/44 |
| 11,551,153 B2 * | 1/2023 | Ramage | G06N 20/00 |
| 11,586,463 B2 * | 2/2023 | Maheshwari | G06N 20/00 |
| 11,593,634 B2 * | 2/2023 | Choudhary | G06N 3/084 |

(Continued)

FOREIGN PATENT DOCUMENTS

EP  3107317 A1 * 12/2016 ............ H04W 4/029

OTHER PUBLICATIONS

Imteaj, et al., "A Survey on Federated Learning for Resource-Constrained IoT Devices", In IEEE Internet of Things Journal, vol. 9, Issue 1, Jan. 1, 2022, pp. 1-24.

(Continued)

*Primary Examiner* — Tadesse Hailu
(74) *Attorney, Agent, or Firm* — Schwegman Lundberg & Woessner, P.A.

(57) ABSTRACT

Methods, systems, and computer programs are presented for generating a usage model for predicting user commands in an app. One method includes receiving model information from client devices. The model is obtained at each client device by training a machine-learning program with app usage data. The server generates synthetic data using the models from the client devices. A machine-learning program is trained using the synthetic data to obtain a global model, which receives as input information about recent commands entered on the app and generates an output with a prediction for the next command expected to be received by the app. The information of the global model is transmitted to a first client device, and the app provides at least one command option in the app user interface based on a prediction, generated by the global model, of the next command expected.

20 Claims, 11 Drawing Sheets

(56) References Cited

U.S. PATENT DOCUMENTS

| | | | | |
|---|---|---|---|---|
| 11,599,927 | B1* | 3/2023 | Flunkert | G06N 3/0442 |
| 11,694,122 | B2* | 7/2023 | Szeto | G16H 10/60 |
| | | | | 706/10 |
| 2014/0282178 | A1* | 9/2014 | Borzello | G06F 9/453 |
| | | | | 715/771 |
| 2017/0124474 | A1* | 5/2017 | Kashyap | G06N 20/00 |
| 2017/0262899 | A1* | 9/2017 | Geraghty | G06Q 30/0277 |
| 2018/0225583 | A1* | 8/2018 | Chen | G06N 20/00 |
| 2018/0302302 | A1* | 10/2018 | Doggett | H04L 67/01 |
| 2018/0367483 | A1* | 12/2018 | Rodriguez | H04L 51/046 |
| 2018/0367484 | A1* | 12/2018 | Rodriguez | H04L 65/1069 |
| 2019/0050746 | A1* | 2/2019 | Sanketi | G06N 5/048 |
| 2019/0050749 | A1* | 2/2019 | Sanketi | G06F 9/44505 |
| 2019/0087691 | A1* | 3/2019 | Jelveh | G06N 3/084 |
| 2019/0303504 | A1* | 10/2019 | Pasumarthy | G06N 3/08 |
| 2019/0384657 | A1* | 12/2019 | Chen | G06F 9/451 |
| 2020/0125586 | A1* | 4/2020 | Rezaeian | G06F 3/048 |
| 2020/0371892 | A1* | 11/2020 | Huang | G06N 20/00 |
| 2020/0391118 | A1* | 12/2020 | Kerr | A63F 13/67 |
| 2020/0410392 | A1* | 12/2020 | Verma | G06N 3/044 |
| 2021/0034946 | A1* | 2/2021 | Kleiner | G06N 3/04 |
| 2021/0042338 | A1* | 2/2021 | Smutko | G06F 11/3438 |
| 2021/0073677 | A1 | 3/2021 | Peterson et al. | |
| 2021/0089548 | A1* | 3/2021 | Lim | G06F 16/335 |
| 2021/0256309 | A1* | 8/2021 | Huth | G06F 18/2148 |
| 2022/0019909 | A1* | 1/2022 | Aggarwal | G06N 7/01 |
| 2022/0051146 | A1* | 2/2022 | Verma | G06N 3/088 |
| 2022/0058507 | A1* | 2/2022 | El-Khamy | G06N 3/045 |
| 2022/0094605 | A1* | 3/2022 | Zaman | H04L 41/082 |
| 2022/0188692 | A1* | 6/2022 | Chakraborty | G06N 20/00 |
| 2022/0237508 | A1* | 7/2022 | Shaloudegi | G06N 3/045 |
| 2022/0414497 | A1* | 12/2022 | Laserson | G06N 20/00 |
| 2023/0050882 | A1* | 2/2023 | Shalai | G06F 16/9574 |

OTHER PUBLICATIONS

"International Search Report and Written Opinion Issued in PCT Application No. PCT/US23/030995", Mailed Date: Oct. 20, 2023, 15 Pages.

Zhou, et al., "A Survey on Federated Learning and its Applications for Accelerating Industrial Internet of Things", In Repository of arXiv:2104.10501v1, Apr. 21, 2021, 13 Pages.

* cited by examiner

APP USAGE MODELS WITH PRIVACY PROTECTION

TECHNICAL FIELD

The subject matter disclosed herein generally relates to methods, systems, and machine-readable storage media for improving application ease-of-use by utilizing application usage data while preserving customer privacy.

BACKGROUND

Understanding usage and commanding behaviors (e.g., commands entered by a user) for an application helps to make better contextual suggestions in the application, as well as improving the future features of the application. For instance, by knowing that users most often click the image crop button after selecting an image, or that users often click the bold or italic button after highlighting text in a document, developers can improve the application to provide quick access to these likely next commands. Better suggestions lead to improved user productivity by enabling users to more easily and quickly select mostly likely next commands and with less effort.

Similarly, by understanding the usage patterns of user cohorts (e.g., financial-services users that often utilize certain combinations of features, commands entered by users preparing resumes), product developers can improve features so that users get the maximum possible benefit from the product.

However, detailed tracking of application usage may compromise the user's desire for privacy, so any usage data that would compromise privacy cannot be used for analysis and improvements. Further, the behaviors of users while using an application may change over time, making old usage data progressively less representative of the current population, and if this data is used for modeling, the resulting models will have low accuracy.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to generating a usage model for predicting user commands in an app. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One aspect relates to telemetry and improved methods for detailed tracking of application usage that provides enhanced user privacy using a client-side model that is trained with captured usage data. Differential privacy is applied to the input data and the model is uploaded to a cloud service to update a global usage model, which in turn generates synthetic data that is not traceable back to individual users.

Another aspect includes a telemetry architecture that employs a federated learning system to retrain a global usage model to produce synthetic data that replaces the raw usage data collected from individual users in a way that enhances privacy. A further aspect includes the use of the synthetic data as further input to specialized models for powering contextual suggestions and recommendations to the user while utilizing the application, also referred to herein as app.

A global model is used to generate synthetic data (data generated by the model that represents, e.g., simulates, usage of the application) about users utilizing the application, as well as to answer questions about how users utilize the application (e.g., what usage patterns are more common for a specific cohort?) to power reports and insights used by product development crews. Since the models are based on synthetic data, the models do not use data of any specific user or organization thereby, user privacy is preserved.

The synthetic data can also be used as input to specialized models for powering contextual suggestions to users, recommendations, etc., based on predicted user input. The models can also be randomly sampled for specific cohorts, e.g., users who work on certain types of documents (resumes, financial spreadsheets, etc.) without collecting user-specific metadata. Thus, the service can reduce bias and ensure better representation of any cohorts using the applications.

Figure 1:
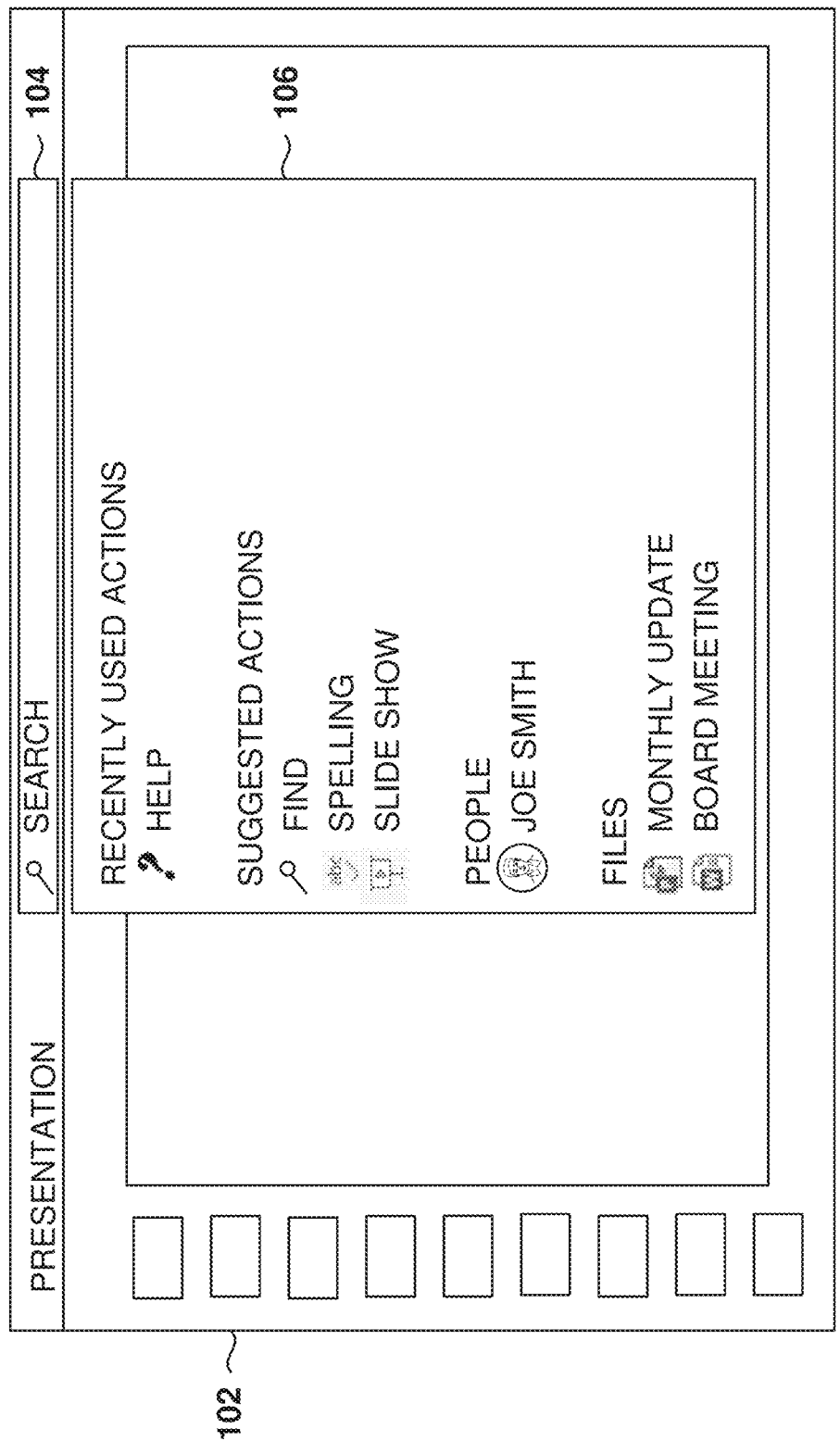
FIG. 1 is a user interface with suggestions for app commands, according to some example embodiments.

One general aspect includes a method that includes an operation for receiving, at a server, model information from a plurality of client devices. The model information is for a model obtained at each client device by training a machine-learning program with app usage data obtained at the client device. The method further includes an operation for generating, at the server, synthetic data generated using the models from the plurality of client devices. The method further includes training a machine-learning program using the synthetic data to obtain a global model. The global model receives as input information about at least one recent command entered on the app and generates an output comprising at least one prediction for the next command expected to be received by the app. The method further includes transmitting information of the global model to a first client device from the plurality of client devices, where the app executing on the first client device provides at least one command option in the app user interface based on a prediction, generated by the global model, of the next command expected, FIG. 1 is a user interface 102 with suggestions 106 for app commands, according to some example embodiments. The illustrated example is for a user utilizing the app Power-Point® from Microsoft®. When the user selects the search entry field 104, the app provides suggestions 106 on the user interface 102. The suggestions 106 are also referred to as suggested actions. Additionally, as used herein, actions performed by the user on the user interface 102 of the app are also referred to as commands.

The user may continue entering text in the search entry field 104 or choose one of the suggestions 106 (e.g., by clicking on one of the suggestions 106, by using arrow keys to select a suggestion 106 followed by the enter key).

In some example embodiments, the suggestions 106 are selected by the app based on one or more factors, such as recent commands entered by the user (e.g., the user selected a block of text, the user selected an image, the user opened a new document), patterns of use of users in the same context, patterns of use for the user utilizing the app, etc.

The suggestions 106 may be of different types, such as recent actions of the user, suggested actions based on context, (e.g., find text, perform a spell check, start a slide show), initiate communications with another user, open a file (e.g., a recently used PowerPoint file, a recently opened Microsoft Word® file). Although the sample user interface 102 is for PowerPoint, the same principles presented here may be used for other applications, such as Microsoft Word®, Microsoft Excel®, Microsoft Outlook®, a web browser, a mobile-phone app, etc.

Additionally, suggestions may also be provided while using other elements of the user interface, such as when the user is entering text or the user has selected a block of text. The suggestions may include operations performed on the text, such as highlighting, bolding, creating bullets, deleting the text, etc.

Figure 2:
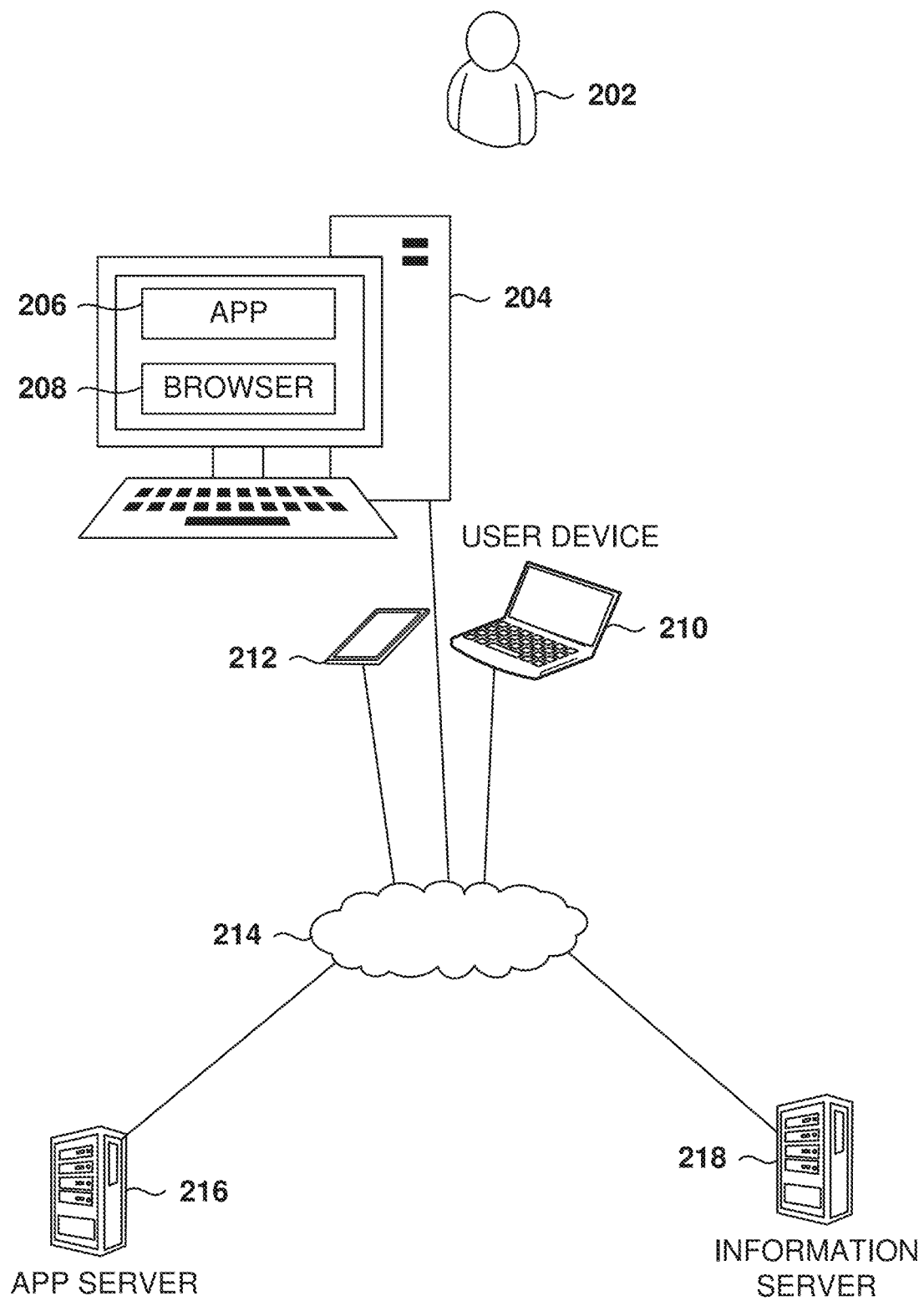
FIG. 2 is a simplified schematic diagram of a computer system for implementing embodiments described herein.

FIG. 2 is a simplified schematic diagram of a computer system for implementing embodiments described herein. The app 206 executes on a client device 204 (e.g., a personal computer) interfacing with the user 202, but other devices may also be utilized, such as mobile phone 212 or a laptop 210.

In some example embodiments, the client device 204 includes the code for implementing the app 206. Additionally, the app 206 may also interface with an app server 216 that provides additional functionality. The app server 216 may be implemented as part of a cloud architecture. In some cases, the app server 216 provides the functionality for the app 206 that may be accessed via a browser 208 executing on the client device 204; that is, the client device 204 does not need to have the app 206 installed to be executed with the browser-based version.

Further, an information server 218 interfaces with e client device 204 and app server 216 to gather app-usage information (e.g., telemetry information) used for analyzing usage data and generating models for predicting commands to be entered by the user 202 based on the app 206 context.

A prediction model may use as an input a sequence of the most recent commands entered by the user, where these commands define the context that is useful to predict the next command that will be entered. The app may offer shortcuts or suggestions to access these predicted commands quickly and easily.

As discussed above with reference to FIG. 1, an example is presented to offer suggestions when the user selects the search entry field 104. Further, the same principles may be used for other app-enhancing purposes, such as predicting next text to be entered, enhancing text based on document purpose, recommending image location and size, etc. Embodiments are described with reference to next-command prediction, but the same principles may be used for other purposes.

Figure 3:
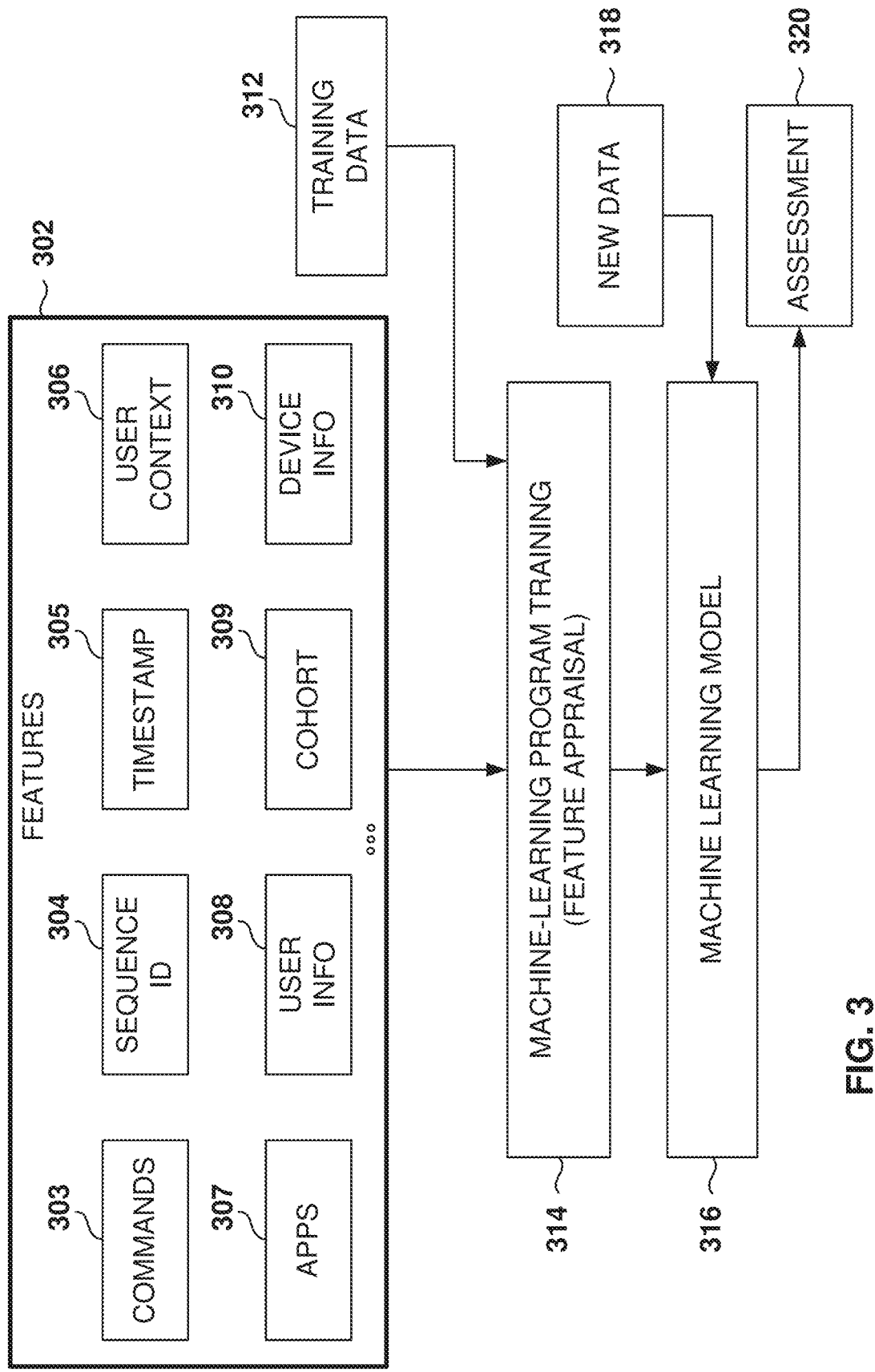
FIG. 3 illustrates the training and use of a machine-learning model, according to some example embodiments.

FIG. 3 illustrates the training and use of a machine-learning model, according to some example embodiments. In some example embodiments, machine-learning (ML) models 316 are utilized to perform operations associated with app commands, such as predicting the next command that the user may input to the app, or generating synthetic data with commands for the app.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 316 from example training data 312 in order to make data-driven predictions or decisions expressed as outputs or assessments 320. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

In some embodiments, an example ML model 316 provides a next command prediction and a confidence level (i.e., a score representing the probability the predicted command will be selected next by the user). For example, the confidence level may be a number from 1 to 100, but other scales are possible. In another example, another ML model 316 generates synthetic commands for the app.

The training data 312 comprises examples of values for the features 302. In some example embodiments, the training data 312 comprises labeled data with examples of values for the features 302 and labels indicating the outcome, such as the command that was selected. The machine-learning algorithms utilize the training data 312 to find correlations among identified features 302 that affect the outcome. A feature 302 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as, numeric, strings, categorical, and graph. A categorical feature is a feature that may be assigned a value from a plurality of predetermined possible values (e.g., this animal is a dog, a cat, or a bird).

In one example embodiment, the features 302 may be of different types and may include one or more of commands entered 303, a sequence identifier (ID) 304 used to label sequences of commands, a timestamp 305 when the command was entered, a user context 306, apps 307 used by the user, user information 308, cohort information 309, device information 310 for the client device used by the user, etc. More details for the features 302 are provided below with reference to FIG. 9.

During training 314, the ML program, also referred to as ML algorithm or ML tool, analyzes the training data 312 based on identified features 302 and configuration parameters defined for the training 314. The result of the training 314 is the ML model 316 that is capable of taking inputs to produce assessments.

Training an ML algorithm involves analyzing large amounts of data (e.g., from several gigabytes to a terabyte or more) in order to find data correlations. The ML algorithms utilize the training data 312 to find correlations among the identified features 302 that affect the outcome or assessment 320. In some example embodiments, the training data 312 includes labeled data, which is known data for one or more identified features 302 and one or more outcomes, such as the commands entered by the user.

The ML algorithms usually explore many possible functions and parameters before finding what the ML algorithms identify to be the best correlations within the data; therefore, training may make use of large amounts of computing resources and time.

When the ML model 316 is used to perform an assessment, new data 318 is provided as an input to the ML model 316, and the Mt model 316 generates the assessment 320 as output. For example, when a user action or command is detected (e.g., the user selected a block of text), the ML model 316 utilizes user and app information as an input to generate an output that includes one or more command IDs and the confidence level for each command to be selected next. In other embodiments, a sequence of possible commands, with the confidence level, is the output of the ML model 316.

In some example embodiments, the new data 318 input includes the history of a predetermined number of most-recent commands entered by the user, and other values for one or more of the features 302 (e.g., where in the document the cursor was placed, the user selected an image last, the user is operating in a cell of a table, the user is adding bullets in a presentation page).

In some example embodiments, results obtained by the ML model 316 during operation (e.g., assessment 320 produced by the model 316 in response to inputs) are used to improve the training data 312, which is then used to generate a newer version of the model 316. Thus, a feedback loop is formed to use the results obtained by the model 316 to improve the model 316.

Figure 4:
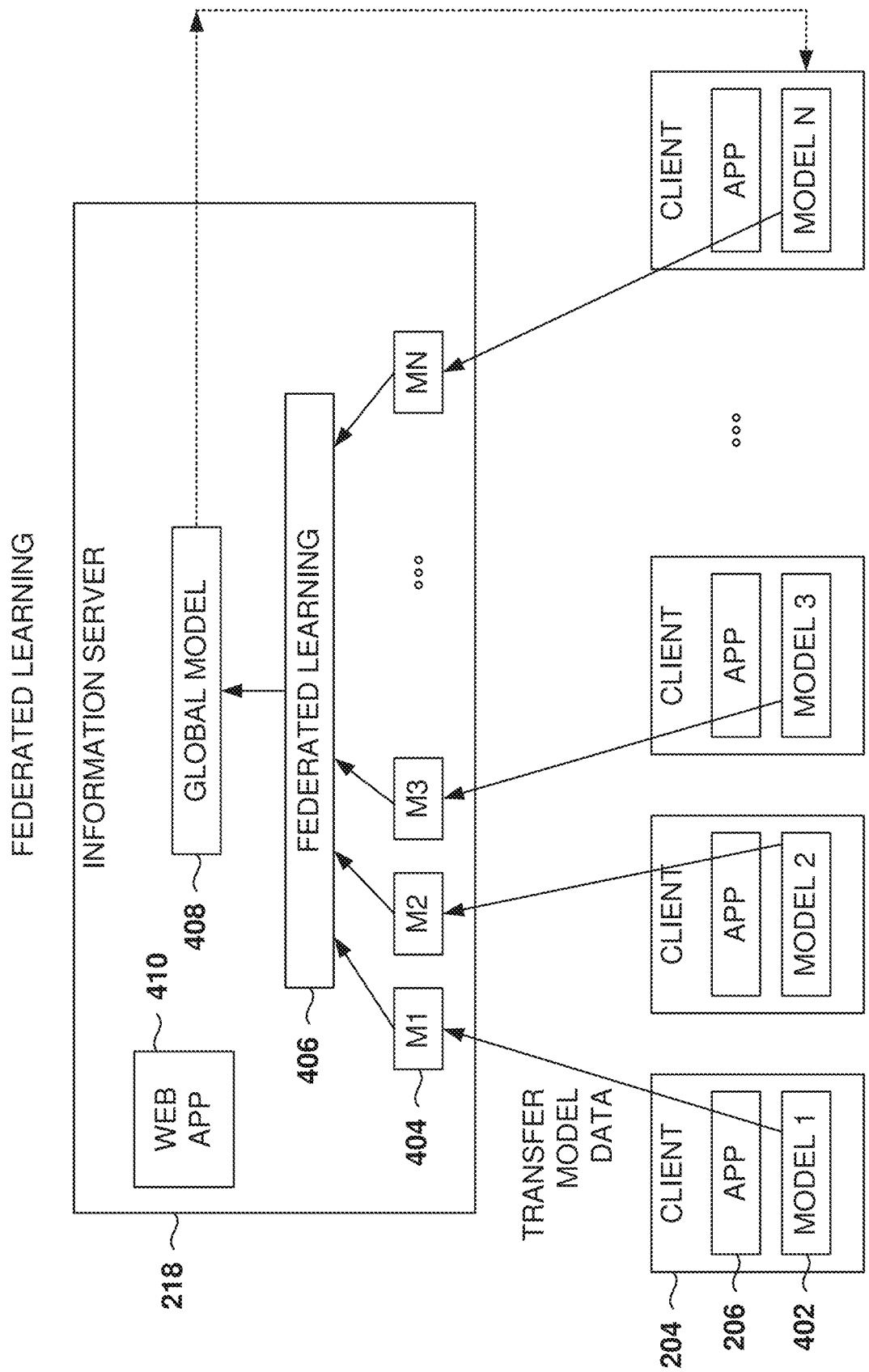
FIG. 4 illustrates a method for generating a global model using federated learning, according to some example embodiments.

FIG. 4 illustrates a method for generating a global model 408 using federated learning 406, according to some example embodiments. A plurality of client devices 204 execute the app 206. In some example embodiments, a model 402 is generated at the client device 204 for making predictions, e.g., predicting the next command tier the app 206.

The training data for each model is generated using, at least in part, the data collected during the execution of the app 206 at the client device 204. Since the model 402 at each client device 204 uses different training data, the model 402 may be different for each client device 204.

In some example embodiments, each client device 204 sends model information to the information server 218. The model information includes the data required to use the model 404 at the information server 218. For example, the model information may include the number of layers of a neural network and the weights for each of the neurons in the neural network.

Using the models 404 sent by the client devices 204, federated learning 406 is used to generate a global model 408. Federated learning is a machine-learning technique that trains an algorithm across multiple decentralized edge devices or servers holding local data samples, without exchanging the local data samples. This approach stands in contrast to traditional centralized machine learning techniques where all the local datasets are uploaded to one server, as well as to more classical decentralized approaches which often assume that local data samples are identically distributed. In this approach, privacy is preserved because the local data samples are not shared with other devices. Further, privacy is preserved because federated learning is configured to avoid reverse engineering of the resulting model to derive the training data used for training.

Federated learning enables multiple actors to build a common, robust machine learning model without sharing data, thus allowing to address critical issues such as data privacy, data security, data access rights and access to heterogeneous data.

The global model 408 may then be used to make predictions, e.g., predicting the next command in the app 206. In some embodiments, the global model 408 may be transferred back to one or more client devices 204, and the client devices 204 can update their own model 402. Additionally, the global model 408 may be used to make predictions when a user is utilizing the web app 410 executing at the information server 218, or at another server such as the app server 216.

The information server 218 takes the knowledge from each client device 204 and aggregates this knowledge into the global model 408, which is built with more information than any of the models 402 from the client devices 204. The global model 408 is shared back to the client devices 204 so that each client device 204 gains from the knowledge of the group of app users. For example, a user utilizing Microsoft Outlook may benefit from better features, such as text prediction, based on the universe of Outlook users.

It is noted that the model 402 may be of a different kind than the global model 408. For example, the model 402 at the client device 204 may be a Long Short-term Memory (LSTM) model (a rather simple ML model) while the global model 408 may be a complex neural network.

Figure 5:
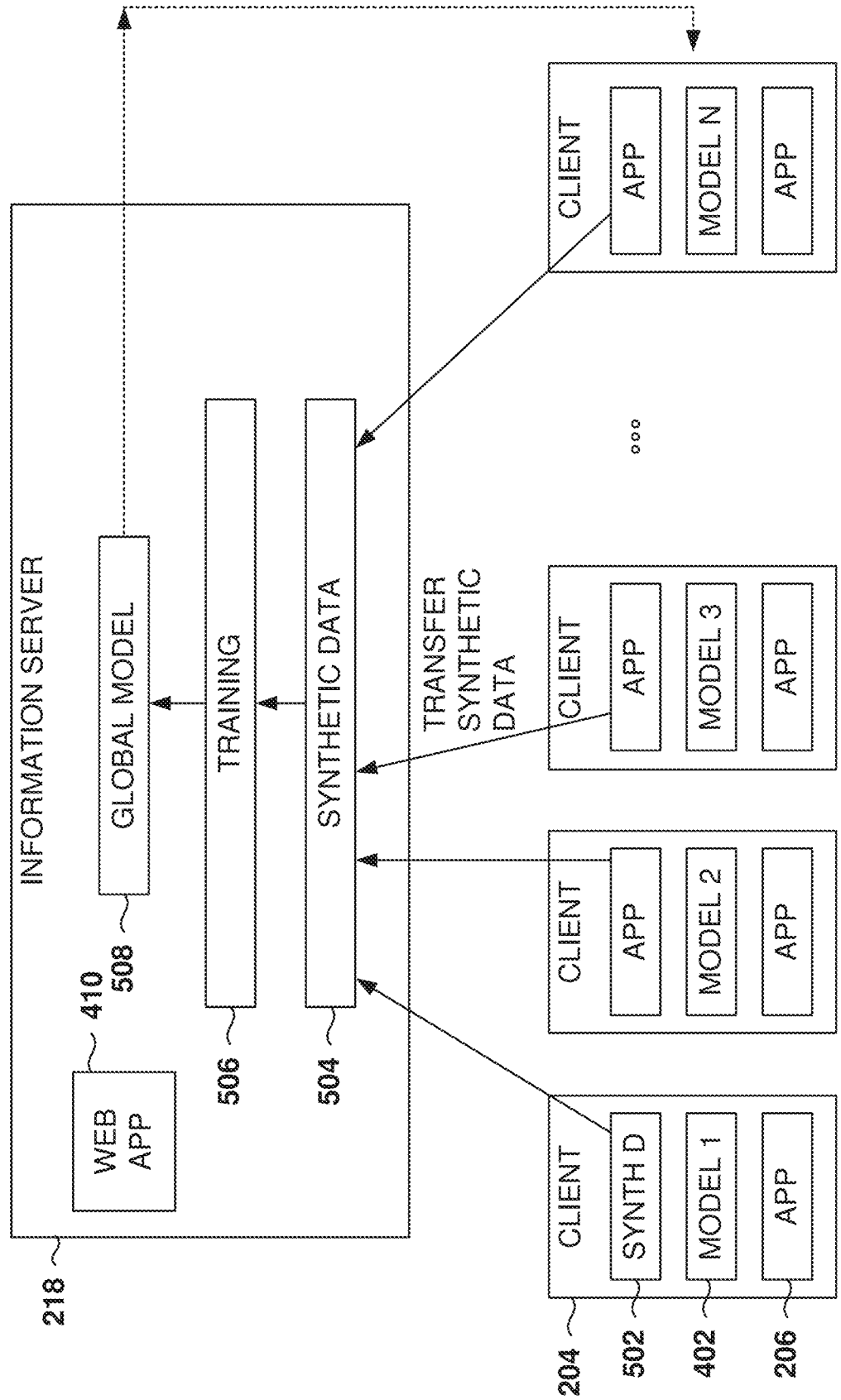
FIG. 5 illustrates a method for generating a global model with synthetic data from clients, according to some example embodiments.

FIG. 5 illustrates a method for generating a global model 508 with synthetic data 504 from clients, according to some example embodiments. In some example embodiments, the model 402 is used to generate synthetic data. Synthetic data is data generated by the model that simulates usage of the application. That is, the synthetic data 504 is not real data of commands entered in the app 206.

Inputs are provided to the model 402 and then the output from the model 402 is the synthetic data 502. The inputs may be random or generated in some other form, such as a list of commands previously entered by users, etc. In one example, the input to the model 402 is a list of commands previously entered by the user, and the output is the synthetic data 502 that is the next predicted command. The input to the model 402 may also include information about the user or values for some other features, such as the features described above with reference to FIG. 3.

Since the synthetic data 502 is not actual usage data of the user, the privacy of the user is maintained when the synthetic data 502 is used to build the global model 508.

The synthetic data 502 from a plurality of client devices 204 is sent to the information server 218. The collection of synthetic data 502 is synthetic data 504, which is used to train the global model 508. The global model 508 may be used to make predictions, and the global model 508 will be more accurate than the individual models 402 because it has a richer variety of data from multiple users. The global model 508 is then transferred to all or some of the client devices 204 to update the models 402 executing on the client devices 204. The global model 508 may also be used for making predictions of users executing the web app 410.

The downloaded model 402 to the client device 204 may also be updated over time at the client device 204 to keep improving the model 402. The process may be iterated multiple times to improve the global model 508. As more data is available, the prediction accuracy of the global model 508 will improve.

The benefit of the synthetic data 504 is that it captures the knowledge and understanding of how the app is used, and the synthetic data 504 can be used to train models for multiple purposes while protecting the privacy of the users. That is, the synthetic data 504 is not tied to a particular user or their specific behaviors in the app, so there much less risk of privacy infringement.

In some example embodiments, in addition to sending the synthetic data 502, some of the actual app usage data generated by users may be transferred. The data may be transferred if the user has authorized the use of the data, or if the data is anonymized so the data may not be traced back to a particular user.

Figure 6:
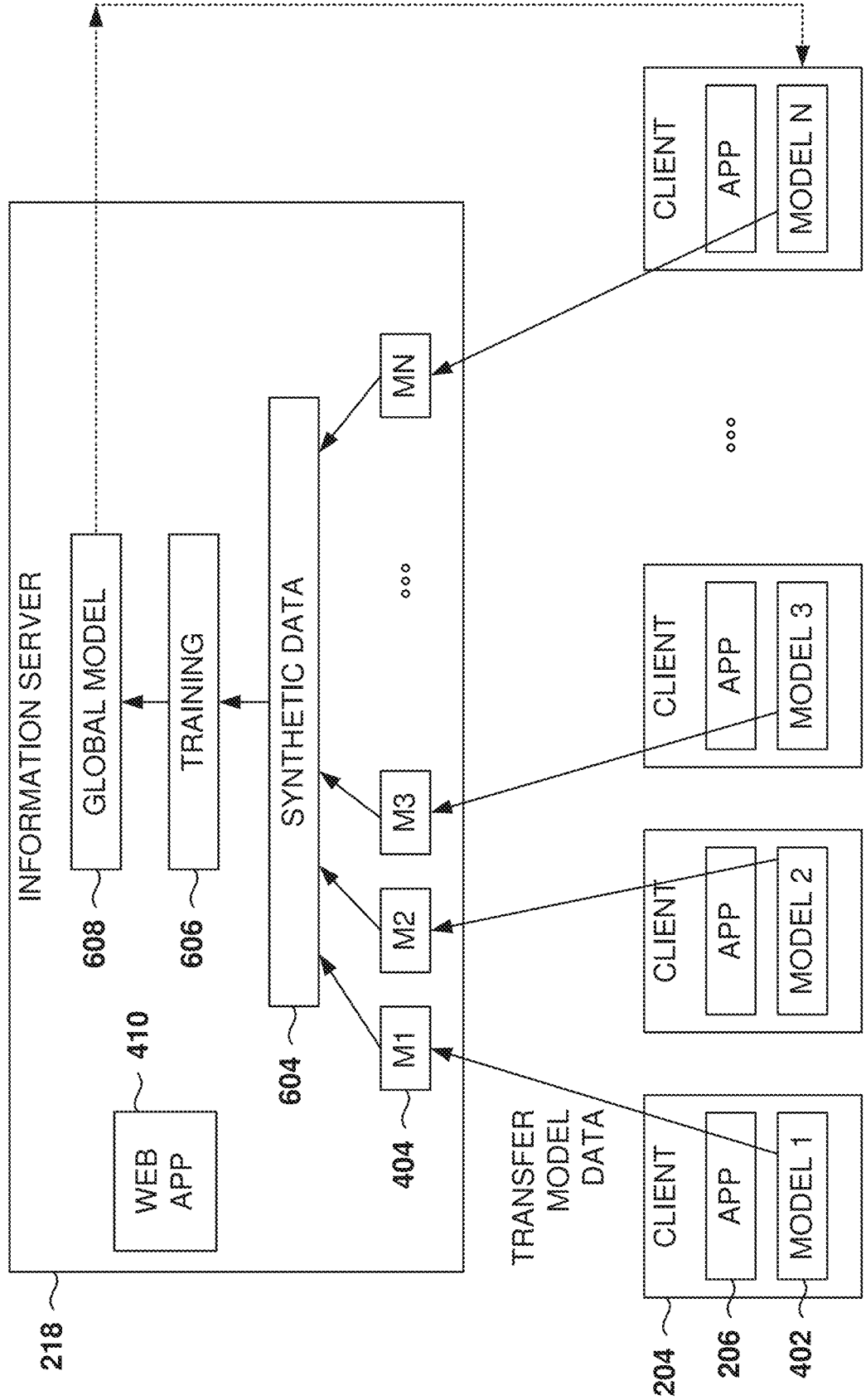
FIG. 6 illustrates a method for generating a global model using synthetic data generated at the server, according to some example embodiments.

FIG. 6 illustrates a method for generating a global model 608 using synthetic data 604 generated at the server, according to some example embodiments. As described with reference to FIG. 4, the data of the model 402 is transferred to the information server 218.

Instead of using federated learning, the information server 218 uses the transferred models 404 to generate synthetic data 604, as described above with reference to FIG. 5.

Once the synthetic data 604 is generated, the information server 218 performs a training 606 using the synthetic data 604 as the training set. The result is a global model 608 that captures information from the plurality of client devices 204, while preserving privacy. The actual usage data at the client devices 204 is not transferred; thus, the privacy is preserved. The global model 608 may be transferred back to the client devices 204 or be used to make predictions for users utilizing the web app 410.

The global model 608 generated with the synthetic data 604 provides a valuable tool for command prediction. For example, by understanding which commands are more likely to be executed, it is possible to provide shortcuts and improve user productivity while using the app 206.

Further, by periodically updating the global model 608 with new synthetic data 604 (derived from updated models 404), the system is able to adapt to changing trends on how the app is used.

One of the advantages of generating the synthetic data 604 at the information server 218 is that only the model information is transferred, instead of having to send all the app usage information from the multiple clients. This results in savings of network bandwidth utilization and computer resources utilization (e.g., the client device 204 saves CPU because it has to transmit less data).

Figure 7:
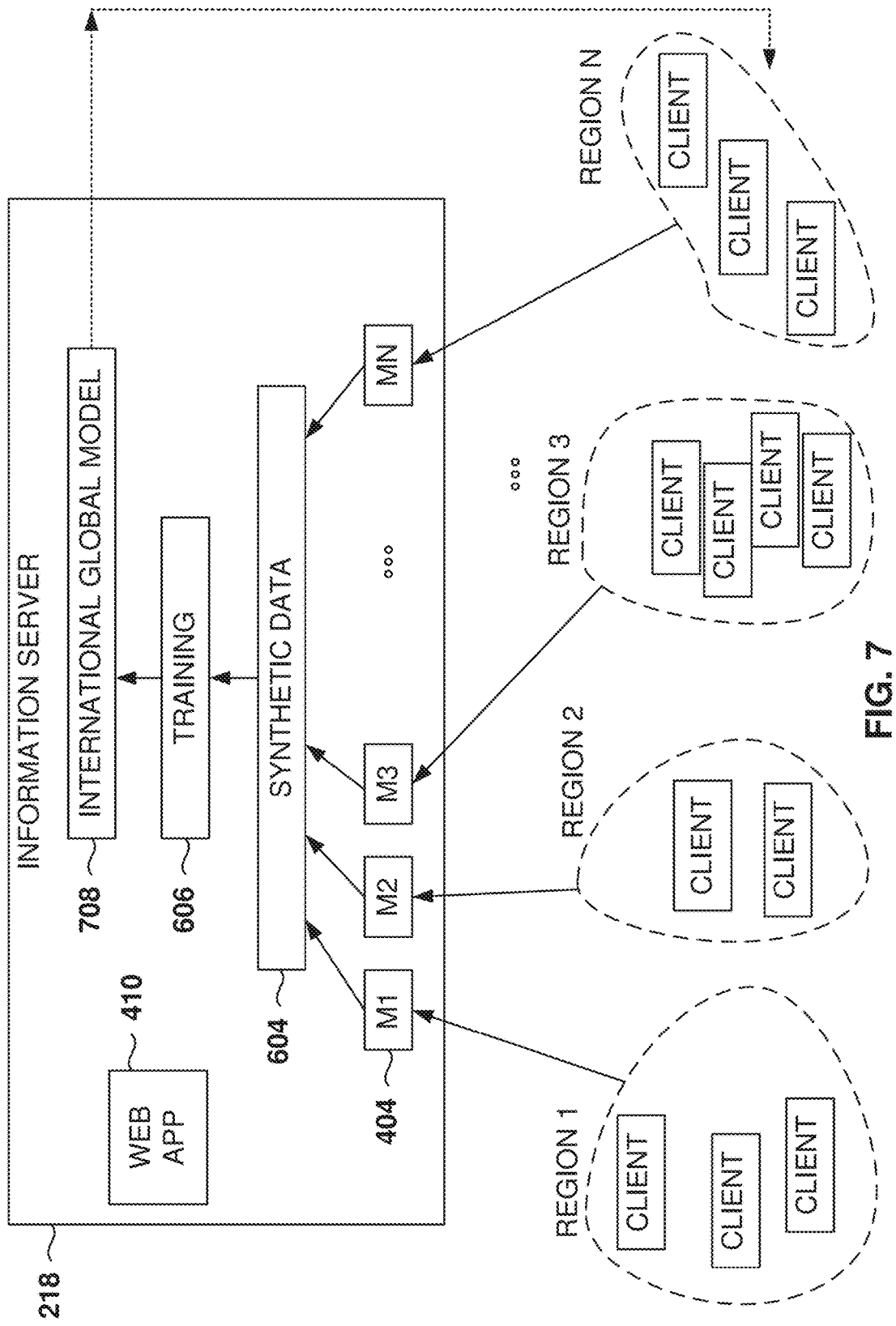
FIG. 7 illustrates a method for generating an international global model for a company utilizing model information from multiple regions, according to some example embodiments.

FIG. 7 illustrates a method for generating an international global model 708 for a company utilizing model information from multiple regions, according to some example embodiments. In some countries or regions, there are requirements on where customer data is stored, and some regulations or contractual commitments forbid the transferring of user data outside the region or boundary.

However, sometimes a company may want to use data from multiple regions to improve the training data set, but since the data may not be transferred to a central location, this might be a difficult proposition.

One solution is to use federated learning. In some cases, federated learning means training models across a plurality of computers with each computer having access to a subset of the data.

Another solution to the regional-data problem is to use synthetic data 604, as illustrated in FIG. 7. The models 404 from the different regions are transmitted to the information server 218, and then the models 404 are used to generate the synthetic data 604. Since the models 404 do not include user data, there is no transmission of user data across regions.

After training 606 with the synthetic data 604, the international global model 708 may be used. This international global model 708 is built based on the information from the different regions, but no actual user data has been transmitted. This is one of the advantages of using synthetic data 604: the synthetic data 604 is not actual user data, but the synthetic data 604 does reflect the behavior of users throughout the different regions.

Figure 8:
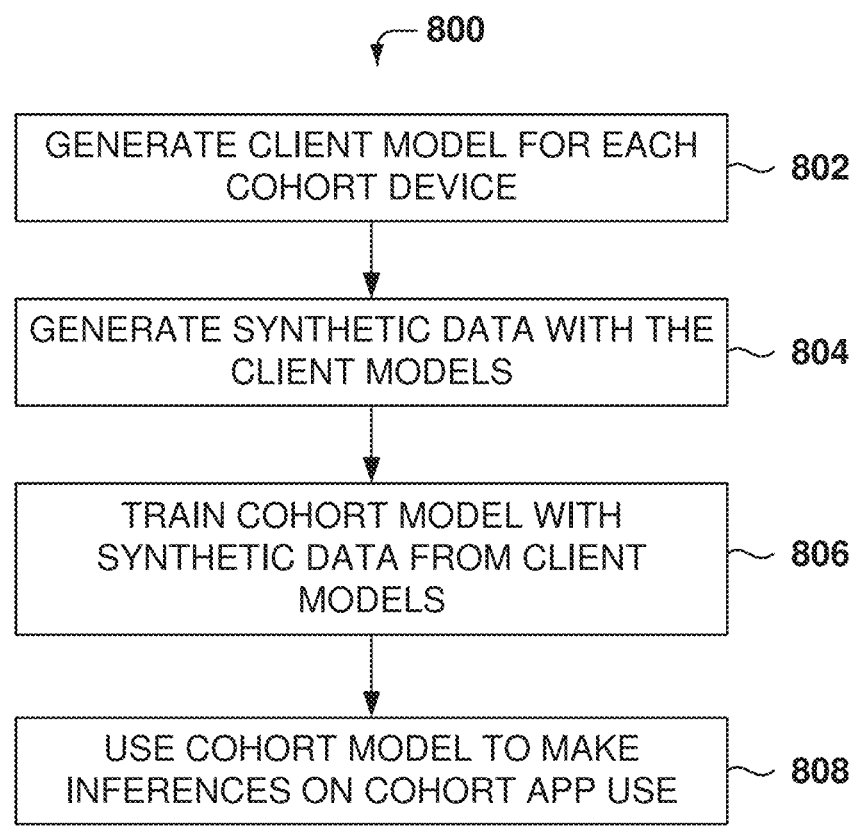
FIG. 8 is a flowchart of a method for generating a model for a cohort of users, according to some example embodiments.

FIG. 8 is a flowchart of a method 800 to generate a model for a cohort of users, according to some example embodiments. As used herein, a cohort refers to a group of users that share one or more characteristic, such as company where they work, entity type (e.g., corporation, Government agency, small business), functional area (e.g., Marketing, Engineering), title (e.g., software developer, marketing specialist), geography (e.g., United States, Europe, India), work situation (e.g., employed, retired, looking for a new job), etc.

Understanding how cohorts use the application may be useful to improve the app for a particular cohort by offering app features that help the members of the cohort. For example, a cohort of users may be patent attorneys, who often perform editing of claims. Once a text processor (e.g., Microsoft Word) detects that the patent attorney is amending claims, shortcuts may be offered to "clean" the claims by eliminating insertions and deletions, changing the claims status (e.g., from "Currently Amended" to "Previously Presented"), provide text prediction (e.g., based on terms defined on the claims), etc.

However, some cohorts may be so small that getting enough training data is difficult. Also, the data may not be transmitted across regions, as described above. By using synthetic data, it is possible to create improved prediction models for a particular cohort. Although the user data may be sparse for machine learning, a large amount of synthetic data may be generated for the cohort.

In the embodiment for the method 800, at operation 802, a client model is generated for each cohort device (the client device utilized by a member of the cohort).

From operation 802, the method 800 flows to operation 804 where the synthetic data is generated using the client models generated at operation 802.

At operation 806, the cohort model is trained with the synthetic data generated with the client models.

Further, at operation 808, the cohort model is used to make inferences (e.g., command predictions) on cohort app usage.

Figure 9:
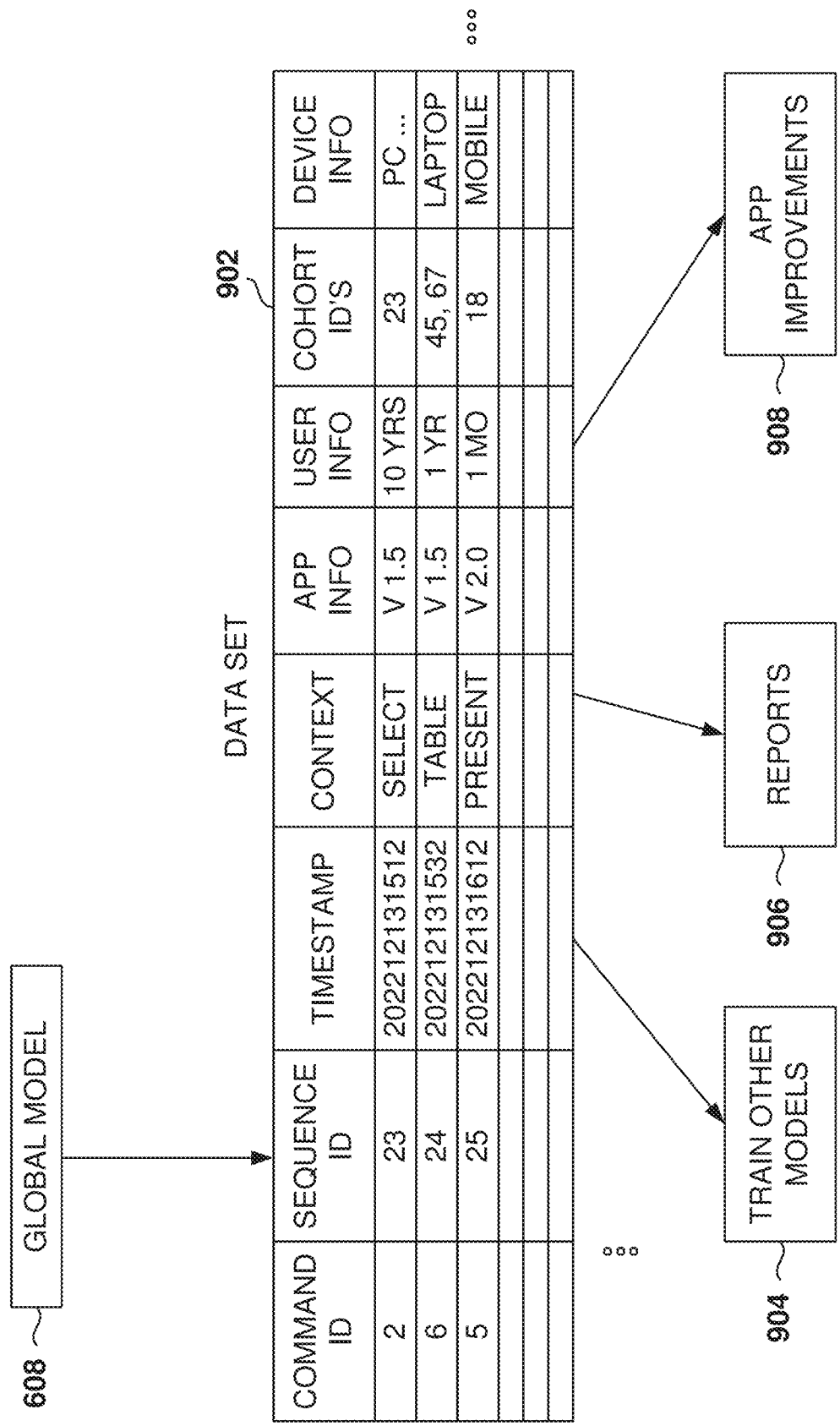
FIG. 9 illustrates the generation of a data set with the global model, according to some example embodiments.

FIG. 9 illustrates the generation of a data set 902 with the global model 608, according to some example embodiments. In some example embodiments, the global model 608 generates as output synthetic usage data for the app, that is, data that simulates user inputs (e.g., commands) in the app.

In one embodiment, the input to the global model 608 is simply a command to generate the synthetic usage data. In other embodiments, the input may include one or more of the feature values to limit the generation of synthetic data to a particular environment. For example, the input may include a cohort identifier, and the global model 608 will generate one or more synthetic commands that would be entered by a member of the cohort.

The output of the global model 608 includes one or more commands (e.g., the input may be an integer to request the generation of 1000 entries). The output is shown in data set 902, which is a table where each row corresponds to a user command, and each column refers to one of the features used for the data set.

The illustrated example includes the features of command ID, sequence ID, timestamp, context information, application information, user information, cohort ID (or IDs if the user belongs to several cohorts), device information, etc.

The command ID is a numerical identifier assigned to the command, where each command in the app has a different identifier. The sequence ID is a numerical value indicating the order of the commands entered, where the sequence ID is increased by one for each new command. The sequence ID may be used to track sequences of commands entered.

The timestamp reflects the time when the command was entered. The context provides information on the state of the app when the command was entered (e.g., the user has selected a block of text, the user has placed the cursor inside a table, the user is editing a presentation document). The user information includes information about the user that entered the command, such as years of experience using the app, region where the user is located, language used, etc.

Additionally, the cohort ID includes an identifier for the cohort, or cohorts, of the user. The device information includes data about the client device being used by the user to interact with that app, such as type of device (e.g., personal computer, laptop, mobile phone), operating system, etc.

Once the data set 902 is generated, the data set 902 may be used to train 904 other models, such as models that predict the next command entered by the user. The data set may also be analyzed to generate reports 906. e.g., statistics on commands more frequently used, contexts where users accessed the help feature, histogram of commands used by a particular cohort, etc.

The data set 902 may be useful to generate app improvements 908. For example, by analyzing when a user needs help, the user interface (UI) of the app may be improved to add a shortcut or a suggestion. Also, a new command may be generated that may include a sequence of other commands (e.g., in the case of a patent-attorney cohort, a single command to "clean" claims to accept amendments). Another command may automatically format a document (e.g., a resume) or a section of the document (e.g., format the Table of Contents).

Figure 10:
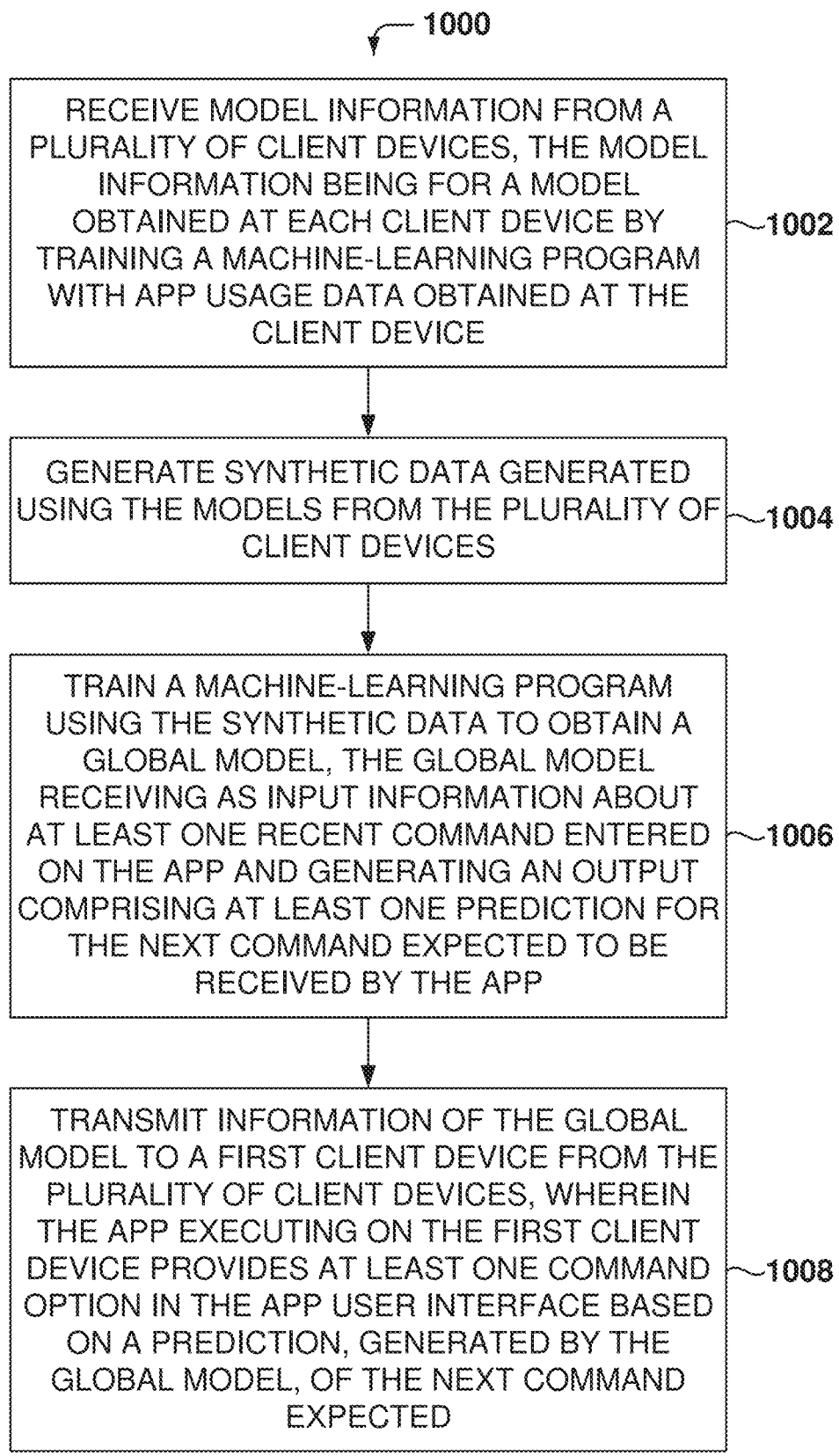
FIG. 10 is a flowchart of a method for generating a usage model for predicting user commands in an app, according to some example embodiments.

FIG. 10 is a flowchart of a method 1000 for generating a usage model for predicting user commands in an app, according to some example embodiments. While the various operations in this flowchart are presented and described sequentially, one of ordinary skill will appreciate that some or all of the operations may be executed in a different order, be combined or omitted, or be executed in parallel.

Operation 1002 is for receiving, at the server, model information from a plurality of client devices. The model information is for a model obtained at each client device by training a machine-learning program with app usage data obtained at the client device.

From operation 1002, the method 1000 flows to operation 1004 for generating, at the server, synthetic data generated using the models from the plurality of client devices.

From operation 1004, the method 1000 flows to operation 1006 for training a machine-learning program using the synthetic data to obtain a global model. The global model receives as input information about at least one recent command entered on the app and generates an output comprising at least one prediction for the next command expected to be received by the app.

From operation 1006, the method 1000 flows to operation 1008 for transmitting information of the global model to a first client device from the plurality of client devices, where the app executing on the first client device provides at least one command option in the app user interface based on a prediction, generated by the global model, of the next command expected.

In one example, the model of the client device is configured for input comprising recent commands entered on the app and producing an output of at least one predicted command to be entered in the app.

In one example, the training is based on features comprising a command identifier (ID), a timestamp, a context of use in the app, information about a user interacting with the app, and information about the client device.

In one example, generating the synthetic data comprises using a random input for one of the models, and generating an output that comprises a simulated command entered in the app.

In one example, the synthetic data comprises data generated by the model that simulates usage of the application.

In one example, the global model is generated with models from client devices in a plurality of regions, wherein actual usage data from the users is not transmitted to the information service.

In one example, the at least one command option in the app user interface includes a shortcut to the next command expected to be received by the app.

In one example, the method 1000 further comprises generating, using synthetic data corresponding to a cohort of users, a cohort model for making predictions for the cohort of users utilizing the app.

In one example, the method 1000 further comprises utilizing the global model for making predictions for a server-based version of the app.

In one example, the method 1000 further comprises generating, by the server, a federated model using federated learning and the model information from the plurality of client devices.

Another general aspect is for a system that includes a memory comprising instructions and one or more computer processors. The instructions, when executed by the one or more computer processors, cause the one or more computer processors to perform operations comprising: receiving model information from a plurality of client devices, the model information being for a model obtained at each client device by training a machine-learning program with app usage data obtained at the client device; generating synthetic data generated using the models from the plurality of client devices; training a machine-learning program using the synthetic data to obtain a global model, the global model receiving as input information about at least one recent command entered on the app and generating an output comprising at least one prediction for the next command expected to be received by the app; and transmitting information of the global model to a first client device from the plurality of client devices, wherein the app executing on the first client device provides at least one command option in the app user interface based on a prediction, generated by the global model, of the next command expected.

In yet another general aspect, a tangible machine-readable storage medium (e.g., a non-transitory storage medium) includes instructions that, when executed by a machine, cause the machine to perform operations comprising: receiving model information from a plurality of client devices, the model information being for a model obtained at each client device by training a machine-learning program with app usage data obtained at the client device; generating synthetic data generated using the models from the plurality of client devices; training a machine-learning program using the synthetic data to obtain a global model, the global model receiving as input information about at least one recent command entered on the app and generating an output comprising at least one prediction for the next command expected to be received by the app and transmitting information of the global model to a first client device from the plurality of client devices, wherein the app executing on the first client device provides at least one command option in the app user interface based on a prediction, generated by the global model, of the next command expected.

The presented embodiments minimize the data collected from client applications, reducing the complexity and quantity of compute resources needed on the cloud. The embodiments also reduce privacy risk of collecting sensitive data from users.

Figure 11:
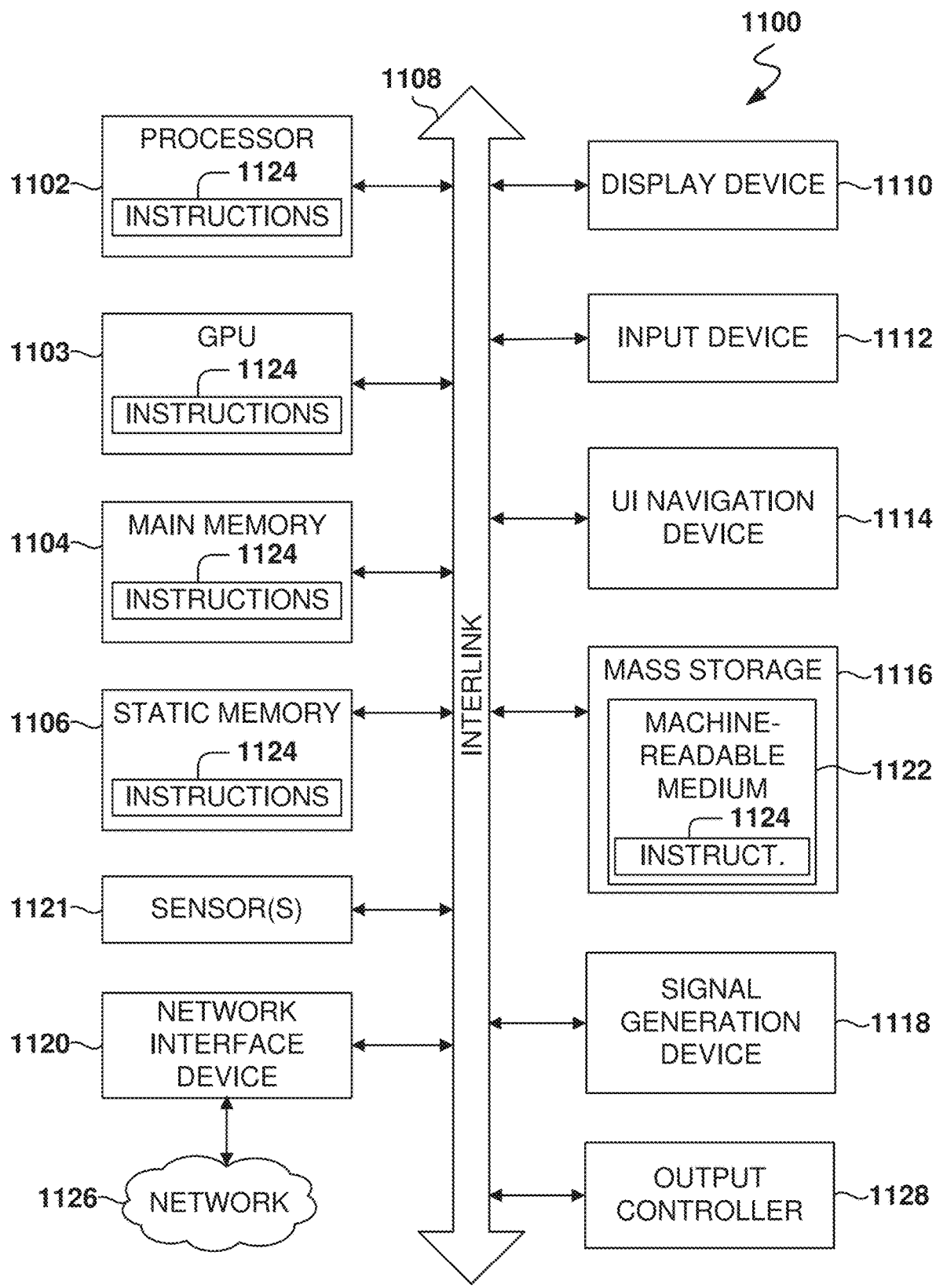
FIG. 11 is a block diagram illustrating an example of a machine upon or by which one or more example process embodiments described herein may be implemented.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100, In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance, Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
  receiving, at a server, model information from a plurality of client devices, the model information being for a model obtained at each client device by training a machine-learning program with app usage data obtained at the client device;
  generating, at the server, synthetic data generated using the models from the plurality of client devices;
  training a machine-learning program using the synthetic data to obtain a global model, the global model receiving as input information about at least one recent command entered on the app and generating an output comprising at least one prediction for the next command expected to be received by the app, wherein the training is based on features comprising a command identifier (ID), a timestamp, a context of use in the app, information about a user interacting with the app, and information about the client device; and
  transmitting information of the global model to a first client device from the plurality of client devices, wherein the global model executing on the first client device generates the prediction for the next command expected, wherein the app executing on the first client device provides at least one command option in an app user interface comprising the next command expected.

2. The method as recited in claim 1, wherein the model of each client device is configured for input comprising recent commands entered on the app and producing an output of at least one predicted command to be entered in the app.

3. The method as recited in claim 1, wherein generating the synthetic data comprises:
  using a random input for one of the models; and generating an output that comprises a simulated command entered in the app.

4. The method as recited in claim 1, wherein the synthetic data comprises data generated by the model that simulates usage of the app.

5. The method as recited in claim 1, wherein the global model is generated with models from client devices in a plurality of regions, wherein actual usage data from the users is not transmitted to the server.

6. The method as recited in claim 1, wherein the at least one command option in the app user interface includes a shortcut to the next command expected to be received by the app.

7. The method as recited in claim 1, further comprising:
generating synthetic data for a cohort of users to simulate utilization of the app; and
generating, using the synthetic data corresponding to a cohort of users, a cohort model for making predictions for the cohort of users utilizing the app, wherein a cohort refers to a group of users that share one or more characteristics.

8. The method as recited in claim 1, further comprising:
utilizing the global model for making predictions for a server-based version of the app.

9. The method as recited in claim 1, further comprising:
generating, by the server, a federated model using federated learning and the model information from the plurality of client devices.

10. The method as recited in claim 1, wherein the global model is used for a specific cohort without collecting user-specific metadata resulting in a reduction of bias.

11. A server comprising:
a memory comprising instructions; and
one or more computer processors, wherein the instructions, when executed by the one or more computer processors, cause the server to perform operations comprising:
receiving model information from a plurality of client devices, the model information being for a model obtained at each client device by training a machine-learning program with app usage data obtained at the client device;
generating synthetic data generated using the models from the plurality of client devices;
training a machine-learning program using the synthetic data to obtain a global model, the global model receiving as input information about at least one recent command entered on the app and generating an output comprising at least one prediction for the next command expected to be received by the app, wherein the training is based on features comprising a command identifier (ID), a timestamp, a context of use in the app, information about a user interacting with the app, and information about the client device; and
transmitting information of the global model to a first client device from the plurality of client devices, wherein the global model executing on the first client device generates the prediction for the next command expected, wherein the app executing on the first client device provides at least one command option in an app user interface comprising the next command expected.

12. The server as recited in claim 11, wherein the model of each client device is configured for input comprising recent commands entered on the app and producing an output of at least one predicted command to be entered in the app.

13. The server as recited in claim 11, wherein generating the synthetic data comprises:
using a random input for one of the models; and
generating an output that comprises a simulated command entered in the app.

14. The server as recited in claim 11, wherein the synthetic data comprises data generated by the model that simulates usage of the app.

15. The server as recited in claim 11, wherein the instructions further cause the one or more computer processors to perform operations comprising:
generating synthetic data for a cohort of users to simulate utilization of the app; and
generating, using the synthetic data corresponding to a cohort of users, a cohort model for making predictions for the cohort of users utilizing the app, wherein a cohort refers to a group of users that share one or more characteristics.

16. A tangible machine-readable storage medium including instructions that, when executed by a machine, cause the machine to perform operations comprising:
receiving, at a server, synthetic data generated at a plurality of client devices using models executing at the plurality of client devices, each model being obtained at each client device by training a machine-learning program with app usage data obtained at the client device;
training a machine-learning program using the synthetic data to obtain a global model, the global model receiving as input information about at least one recent command entered on the app and generating an output comprising at least one prediction for the next command expected to be received by the app; and
transmitting information of the global model to a first client device from the plurality of client devices, wherein the global model executing on the first client device generates the prediction for the next command expected, wherein the app executing on the first client device provides at least one command option in an app user interface comprising the next command expected.

17. The tangible machine-readable storage medium as recited in claim 16, wherein the model of each client device is configured for input comprising recent commands entered on the app and producing an output of at least one predicted command to be entered in the app.

18. The tangible machine-readable storage medium as recited in claim 16, wherein the training is based on features comprising a command identifier (ID), a timestamp, a context of use in the app, information about a user interacting with the app, and information about the client device.

19. The tangible machine-readable storage medium as recited in claim 16, wherein the synthetic data is generated by:
using a random input for one of the models; and
generating an output that comprises a simulated command entered in the app.

20. The tangible machine-readable storage medium as recited in claim 16, wherein the synthetic data comprises data generated by the model that simulates usage of the app.

* * * * *